Figure 1:
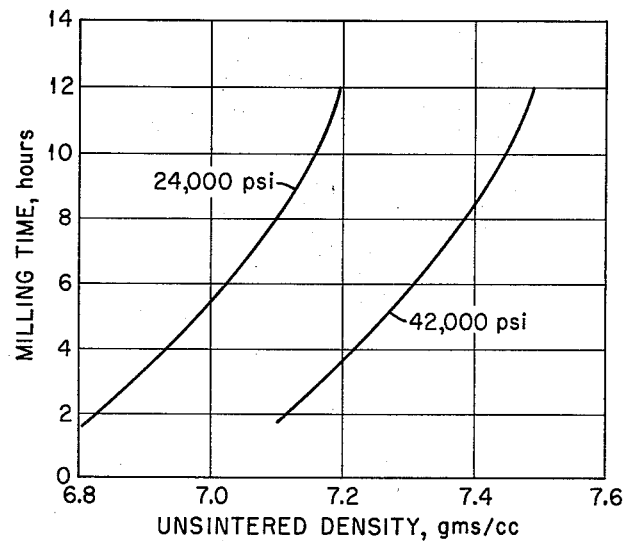

United States Patent Office 3,189,666
Patented June 15, 1965

3,189,666
METHOD OF PREPARING URANIUM DIOXIDE FUEL COMPACTS
Ralph P. Levey, Jr., Oak Ridge, and Paul E. Trent, Norris, Tenn., assignors to the United States of America as represented by the United States Atomic Energy Commission
Filed Oct. 2, 1963, Ser. No. 313,403
4 Claims. (Cl. 264—21)

Our invention relates to fuel material for nuclear reactors and more particularly to the preparation of sintered uranium dioxide fuel compacts.

Uranium dioxide in the form of sintered compacts is useful as fuel material for various types of nuclear reactors. $UO_2$ fuel compacts are required to have a high sintered density, normally about 95 percent of theoretical, regular surfaces conforming to close dimensional tolerances and a high degree of purity. Fabrication of $UO_2$ compacts has been effected by preparing the $UO_2$ in the form of sinterable powder, converting the powder to free-flowing granules, compressing the granulated material into the desired shape such as cylindrical or tubular pellets, and sintering the resulting compacts in a reducing asmosphere.

One of the problems presented in the preparation of $UO_2$ compacts is the provision of $UO_2$ powder suitable for economical large-scale fabrication into compacts with the desired density, purity and dimensional regularity. While numerous methods have been employed for the preparation of sinterable $UO_2$ for compact formation, two approaches have, in general, been followed with regard to powder sinterability. On the one hand, the $UO_2$ is prepared in highly sinterable form suitable for compact formation without use of a binder and without further treatments to enhance sintering. Preparation of this type material is exemplified by the process of U.S. Patent 3,037,839 issued June 5, 1962, to John M. Googin, and assigned to a common assignee. $UO_2$ prepared by this method is advantageous in its ability to form a strong compact without a binder and in its high degree of sinterability. Disadvantages are presented, however, in its high cost, owing to the close process control required, and in the fact that pellet shrinkage during sintering is excessive, resulting in a tendency of cylindrical compacts to distort to irregular or "hourglass" shapes. The other approach has been to prepare $UO_2$ of lower cohesiveness and sinterability and to obtain the required green-compact-forming ability by the use of additives such as organic binders and the required sinterability by mechanical treatments such as extended milling. This approach is favorable in its cost since $UO_2$ of low sinterability is much less expensive to produce, and for some types of material such as high-fired $UO_2$, shrinkage and distortion of compacts during sintering is minimized. The use of additives for compact-formation, however, introduces contaminants so that purity is decreased, and treatments to enhance sintering result in further contamination. It is desired to provide a means of preparing high-density sintered compacts from the less expensive, high-fired $UO_2$ without significantly decreasing the produce purity.

It is, therefore, an object of our invention to provide an economical method of preparing sintered $UO_2$ compacts.

Another object is to provide $UO_2$ suitable for forming compacts having sufficient strength for handling without use of an added binder.

Another object is to provide a method of preparing high-density sintered compacts from relatively inexpensive $UO_2$ of low sinterability.

Another object is to provide a method of preparing $UO_2$ compacts wherein distortion during sintering is minimized.

Other objects and advantages of our invention will be apparent from the following detailed description and claims appended hereto.

In accordance with our invention, high-density sintered $UO_2$ compacts are prepared by intimately mixing high-fired $UO_2$ of low-sinterability with highly sinterable $UO_2$ at a proportion of 1 to 10 weight percent highly sinterable $UO_2$, compressing the resulting mixture into compacts and sintering the compacts in a reducing atmosphere. In this process, the $UO_2$ mixture is compressed into compacts having sufficient strength for handling without an added binder so that contamination from this source is avoided. This mixture also sinters to a high density of over 95 percent of theoretical with minimized shrinkage and distortion. The cost of fuel compacts is substantially decreased since only a small amount of the more expensive highly sinterable material is consumed.

We have found that an intimate mixture of the stated composition behaves in a highly favorable manner in compact formation. Although our invention is not to be understood as limited to a particular theory, it is postulated that the high-fired $UO_2$ of low sinterability is held together strongly in the green compact by the adhesive properties of the highly sinterable $UO_2$ and that the high surface area and small particle size of the latter material allow it to substantially fill the intergranular voids of the compacted body. In the sintering step the two types of $UO_2$ merge into a single phase and each material loses its individual identity.

The term "highly sinterable $UO_2$" as used herein is intended to refer to $UO_2$ powder which sinters to density of at least 10.5 grams per cubic centimeter upon being compressed at a pressure of at least about 10,000 pounds per square inch and heated to a temperature of 1400° C. for at least 2 hours under a reducing atmosphere. The physical properties of this material are as follows: surface area, 6 to 8 square meters per gram; average particle size, less than 40 microns; and tap density, 1.2 to 2.0 grams per cubic centimeter. The oxygen-to-uranium ratio of highly sinterable $UO_2$ is from about 2.08 to 2.17. Although the method of preparing the highly sinterable $UO_2$ is not critical to our invention, it is preferred to use $UO_2$ prepared by the method of U.S. Patent 3,037,839 referred to above. This method comprises precipitating uranium as polyuranates from an aqueous uranyl fluoride solution with a large excess of ammonium ions, converting the precipitate to $U_3O_8$ by heating with steam at a temperature of 450° C. to 600° C, reducing the $U_3O_8$ to $UO_2$ with hydrogen at a temperature 550° C. to 600° C., and partially reoxiding the $UO_2$ to the specified oxygen-to-uranium ratio.

The term "high-fired $UO_2$ of low sinterability" as used herein is intended to refer to $UO_2$ fired to a temperature of at least 1000° C. in a reducing atmosphere or at least 1600° C. in an inert atmosphere during or subsequent to its preparation. This treatment serves to densify the $UO_2$ particles and to decrease the surface area and sinterability. The physical properties of this material are as follows: surface area, 0 to 1.5 square meters per gram; average particle size, 1 to 20 microns; and tap density, 4 to 6 grams per cubic centimeter. The oxygen-to-uranium ratio is from 2.0 to 2.07. The method of preparing this material is likewise not critical to our inventon. It is preferred, however, to use commercially available $UO_2$ prepared by the following process: precipitation of uranium from aqueous solution as ammonium polyurante with ammonium hydroxide, conversion of the precipitate to $U_3O_8$ with steam at 800° C., and heating the $U_3O_8$ to a temperature of at least about 1600° C. in an inert atmosphere to produce $UO_2$, which is then ground to the specified size. Another method which may be employed for producing this material comprises oxidation of uranium metal to $U_3O_8$ and reduction of the $U_3O_8$ to $UO_2$ with hydrogen at a temperature of 1200° C. to 1800° C.

The two types of $UO_2$ described above are intimately mixed at a proportion of 1 to 10 weight percent highly sinterable $UO_2$. At least one percent of this material is required to obtain cohesive compacts, and at proportions above 10 percent, density of the compacts, both in the green and sintered states, is sharply decreased. Maximum density is obtained at 4 to 6 weight percent, and this proportion is accordingly preferred.

Intimate mixing is required to fully disperse the fine particles of highly sinterable material over the surface of the other $UO_2$ particles. Intimate mixing may be effected by milling the mixture for a period of at least about 2 hours. A conventional ball mill using tungsten carbide balls is suitable for this purpose. The green compact density and the sintered density are increased with increased milling times, other conditions being equal. For example, under typical conditions, the green density of five weight percent highly sinterable $UO_2$ compacts compressed at 24,000 pounds per square inch is increased from 6.8 grams per cubic centimeter at 2 hours milling time to 7.2 grams per cubic centimeter at 12 hours. The density obtained after sintering is in turn increased from 94 to 96 percent of theoretical. For the same mixture compressed at a pressure of 42,000 pounds per square inch, green density is increased from 7.1 to 7.5 grams per cubic centimeter and sintered density is increased from 96 to 97 percent of theoretical upon increasing the milling time from 2 to 12 hours. The variables of milling time and pressure may be adjusted depending on the density desired in the product and the equipment available.

Although not critical to our invention, the powder mixture may be converted to free-flowing granules prior to compact formation in order to provide better handling characteristics. Granulation may be effected by compressing the mixture into a solid body at a pressure of 4000 to 8000 pounds per square inch and comminuting the body to particles smaller than 35 mesh (U.S. Sieve Series) in size.

The intimate mixture is then compressed by conventional techniques to form green compacts. No binder or other additive is required. In order to obtain a sintered density of 95 percent without an excessive milling period, a pressure of at least 20,000 pounds per square inch is required in this step. A pressure of 20,000 to 30,000 pounds per square inch, in combination with a milling time of 6 to 12 hours, is preferred.

The green compacts are then sintered in a reducing atmosphere. A temperature of at least 1700° C. is required to obtain the desired density, and about 1900° C. is preferred. A period of at least 4 hours is required at the preferred temperature.

The compacts undergo a shrinkage of about 12 to 13 volume percent under typical conditions, and this shrinkage is taken into account in sizing the compacts. The $UO_2$ mixture described above sinters uniformly and without distortion so that close dimensional tolerances, e.g., ±0.001 inch per inch, may be met without machining or surface finishing.

Our invention is not limited to a particular compact size or shape, and fuel elements of a variety of configurations may be prepared by this method. In general, however, cylindrical or tubular pellets up to about one inch in diameter are desired as $UO_2$ fuel compacts.

Our invention is further illustrated by the following specific examples.

EXAMPLE I

Mixtures of varying proportions of highly sinterable $UO_2$ powder and high-fired $UO_2$ of low sinterability were compressed into pellets and sintered to determine the densities attainable. The highly sinterable $UO_2$ was prepared by the process of U.S. Patent 3,037,839, described above, and had the following physical properties: tap density, 1.6 grams per cubic centimeter; helium displacement density, 10.9 grams per cubic centimeter; surface area, 6.2 square meters per gram; particle size, 2 to 40 microns (12 microns average). The high fired $UO_2$ was prepared by precipitation of ammonium polyuranate from uranyl fluoride solution, conversion of the precipitate to $U_3O_8$ with steam at a temperature of 700° C., reduction of the $U_3O_8$ to $UO_2$ in an inert atmosphere at a temperature of 1650° C. and grinding the $UO_2$ to size. The properties of the resulting high-fired $UO_2$ were as follows: tap density, 4.4 grams per cubic centimeter; helium displacement density, 10.9 grams per cubic centimeter; surface area 1.07 square meters per gram; particle size, less than 20 microns and oxygen-to-uranium ratio, 2.03. Mixtures containing 1 to 10 weight percent highly sinterable $UO_2$ in 1 percent increments, were mixed by ball-milling for 4 hours and the resulting mixture was compressed into cylindrical compacts 0.6 inch long and 0.7 inch in diameter at a pressure of 25,000 pounds per square inch. The compacts were sintered at 1900° C. for 4 hours in a hydrogen atmosphere. The sintered density was determined by water displacement. The percent shrinkage was determined by comparing the dimensions of the unsintered and sintered compacts. The results obtained may be seen by reference to the following table.

*Table 1*

SINTERED DENSITIES AND SHRINKAGE FOR $UO_3$ MIXTURES

| Highly sinterable $UO_2$ content (wt. percent) | Sintered density (percent of theoretical) | Shrinkage during sintering (percent) |
| --- | --- | --- |
| 1 | 94.72 | 12.2 |
| 2 | 94.68 | 12.5 |
| 3 | 94.28 | 12.6 |
| 4 | 95.01 | 12.1 |
| 5 | 95.10 | 12.2 |
| 6 | 95.20 | 12.1 |
| 7 | 94.50 | 12.7 |
| 8 | 94.70 | 12.5 |
| 9 | 94.45 | 12.8 |
| 10 | 93.80 | 12.8 |

It may be seen that high densities were obtained for these powder mixtures and that maximum density was obtained at 4 to 6 percent highly sinterable $UO_2$.

EXAMPLE II

Twenty pellets of 5 weight percent highly sinterable $UO_2$ were prepared by the procedure of Example I. These pellets sintered to densities of 95.83 to 96.0, indicating a high degree of reproducibility in preparing sintered compacts by this method.

EXAMPLE III

Figure 2:
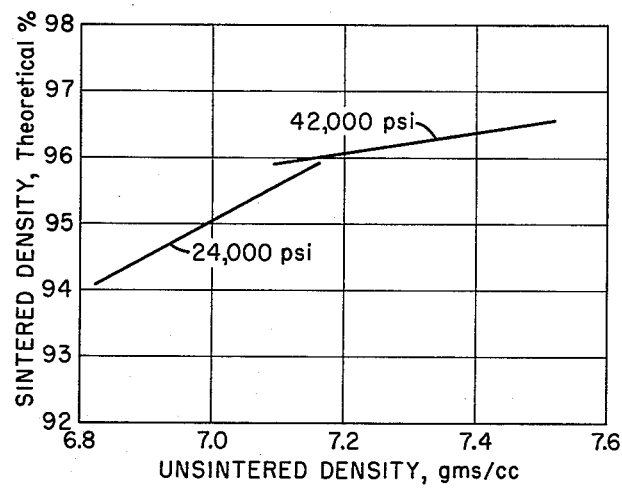

Sintered compacts were prepared by the method of Example I except that pressures of 24,000 p.s.i. and 42,000 p.s.i. were used and the milling time in mixing the powders was varied from 2 to 16 hours. The results obtained may be seen by reference to FIGURE 1 in the drawing wherein unsintered density is plotted as a function of milling time and FIGURE 2 wherein sintered density in turn is plotted as a function of unsintered density. It may be seen that densities over 95 percent of theoretical are attained at these pressures without an excessively long milling period. The combination of pressure and milling time desired for a given density may be selected from the values plotted in these figures.

EXAMPLE IV

High-fired $UO_2$ having the properties listed in Example I was fabricated into pellets without addition of highly sinterable $UO_2$. The high-fired $UO_2$ was milled for 10 hours, compressed into pellets and sintered at 1900° C. in hydrogen for 4 hours. The sintered pellets were examined and density was determined by water displacement. The results obtained may be seen by reference to the following table.

Table II
PELLETS PREPARED FROM HIGH-FIRED $UO_2$

| Pellet Number | Forming Pressure (pounds per square inch) | Density | Pellet Condition |
|---|---|---|---|
| 1 | 9,800 | 93.23 | Cracked. |
| 2 | 9,800 | 93.29 | Laminated. |
| 3 | 19,600 | 93.88 | Broken. |
| 4 | 19,600 | 93.91 | Cracked. |
| 5 | 29,400 | 94.14 | Broken. |
| 6 | 29,400 | 93.76 | Broken. |

It may be seen from the above table that fabrication of high-fired $UO_2$ into pellets without addition of highly sinterable $UO_2$ is unsatisfactory, both with regard to pellet condition and sintered density.

The above examples are merely illustrative and are not to be understood as limiting the scope of our invention, which is limited only as indicated by the appended claims. It is also to be understood that variations in apparatus and procedure may be employed by one skilled in the art without departing from the scope of our invention.

Having thus described our invention, we claim:
1. The method of preparing sintered $UO_2$ compacts which comprises intimately mixing high sintered $UO_2$ having a surface area of 6 to 8 square meters per gram, a particle size less than 40 microns, a tap density of 1.2 to 2.0 grams per cubic centimeter and an oxygen-to-uranium ratio of 2.08 to 2.17 with high-fired $UO_2$ having a surface area less than 1.5 square meters per gram, a particle size of 1 to 20 microns, a tap density of 4 to 6 grams per cubic centimeter and an oxygen-to-uranium ratio of 2.0 to 2.07 at a proportion of 1 to 10 weight per cent highly sinterable $UO_2$, compressing the resulting mixture into compacts at a pressure of at least 20,000 pounds per square inch and sintering said compacts in a reducing atmosphere at a temperature of at least 1700° C.
2. The method of claim 1 wherein said highly sinterable $UO_2$ is provided in said mixture at a proportion of 4 to 6 weight percent.
3. The method of claim 2 wherein said mixture is milled for a period of about 6 to 12 hours.
4. The method of claim 3 wherein said compacts are formed by pressing said mixture at a pressure of 20,000 to 30,000 pounds per square inch.

No references cited.

CARL D. QUARFORTH, *Primary Examiner.*
BENJAMIN R. PADGETT, *Examiner.*

---

UNITED STATES PATENT OFFICE

CERTIFICATE OF CORRECTION

Patent No. 3,189,666            June 15, 1965

Ralph P. Levey, Jr., et al.

It is hereby certified that error appears in the above numbered patent requiring correction and that the said Letters Patent should read as corrected below.

Column 1, line 25, for "asmosphere" read -- atmosphere --; column 2, line 51, after "temperature" insert -- of --; line 52, for "reoxiding" read -- reoxidizing --; line 68, for "polyurante" read -- polyuranate --; column 4, Table I, in the heading to the table, for "$UO_3$" read -- $UO_2$ --; column 6, line 3, for "high sintered" read -- highly sinterable --.

Signed and sealed this 18th day of January 1966.

(SEAL)
Attest:

ERNEST W. SWIDER            EDWARD J. BRENNER
Attesting Officer            Commissioner of Patents

UNITED STATES PATENT OFFICE
CERTIFICATE OF CORRECTION

Patent No. 3,189,666                              June 15, 1965

Ralph P. Levey, Jr., et al.

It is hereby certified that error appears in the above numbered patent requiring correction and that the said Letters Patent should read as corrected below.

Column 1, line 25, for "asmosphere" read -- atmosphere --; column 2, line 51, after "temperature" insert -- of --; line 52, for "reoxiding" read -- reoxidizing --; line 68, for "polyurante" read -- polyuranate --; column 4, Table I, in the heading to the table, for "$UO_3$" read -- $UO_2$ --; column 6, line 3 for "high sintered" read -- highly sinterable --.

Signed and sealed this 18th day of January 1966.

(SEAL)
Attest:

ERNEST W. SWIDER                                    EDWARD J. BRENNER
Attesting Officer                                         Commissioner of Patents